Nov. 4, 1924.　　　P. L. CRON　　　1,514,136
ATMOSPHERIC MOTOR CONTROL, BACK FIRE TRAP, AND MOTOR LOCK
Original Filed May 10, 1922　　　4 Sheets-Sheet 1
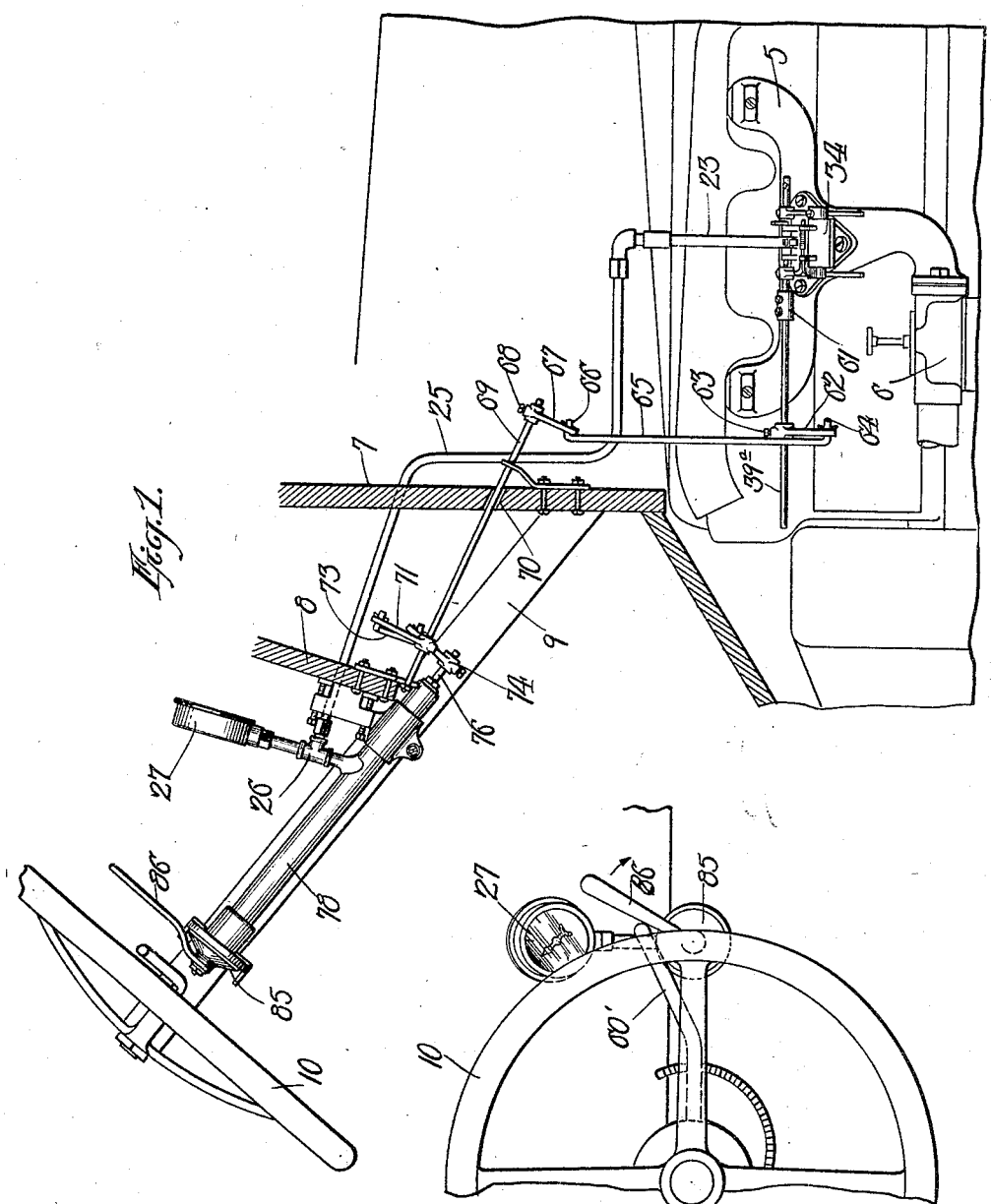
INVENTOR.
PETER L. CRON.
BY Richard D. Bwen
ATTORNEY.

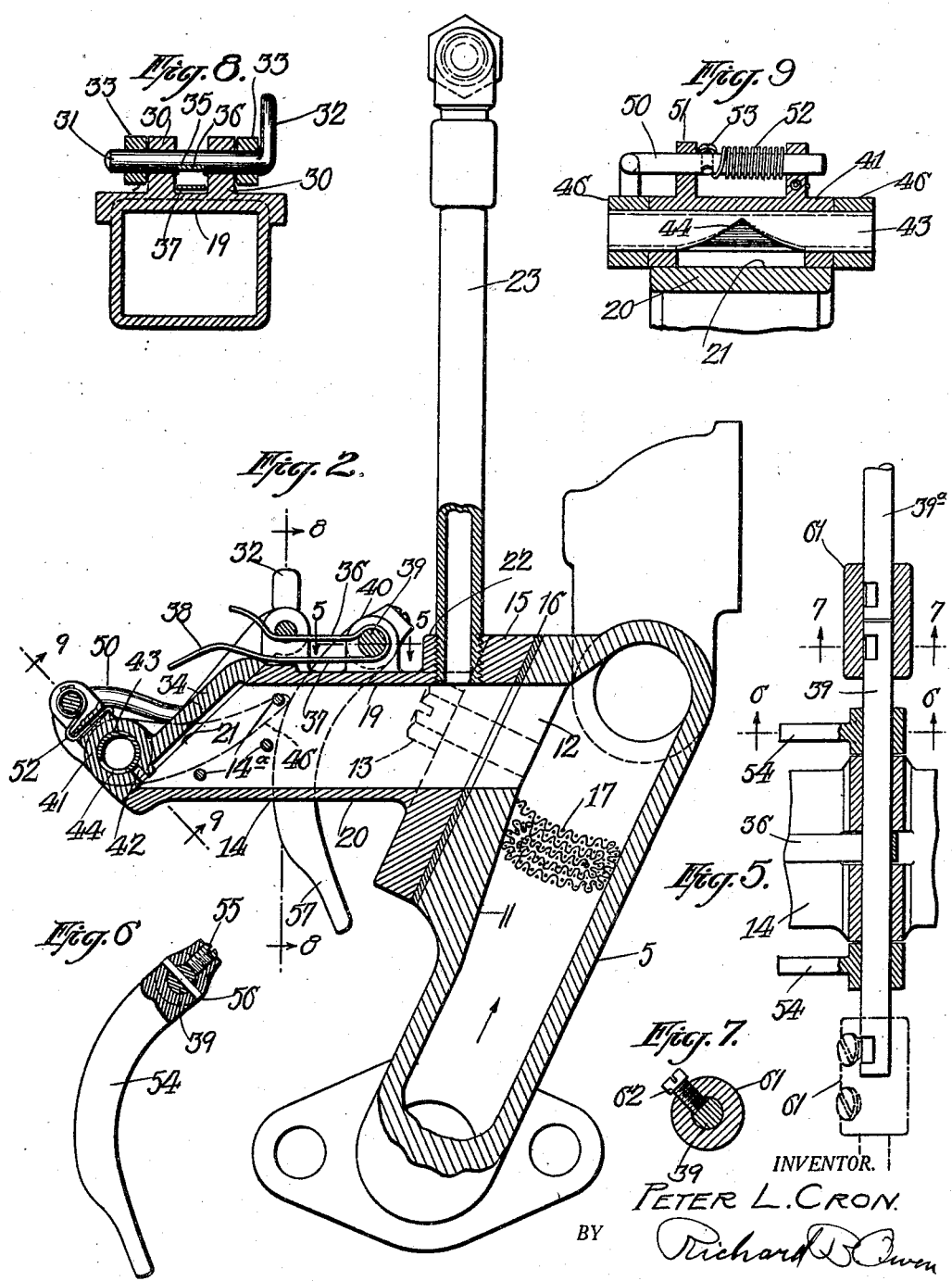

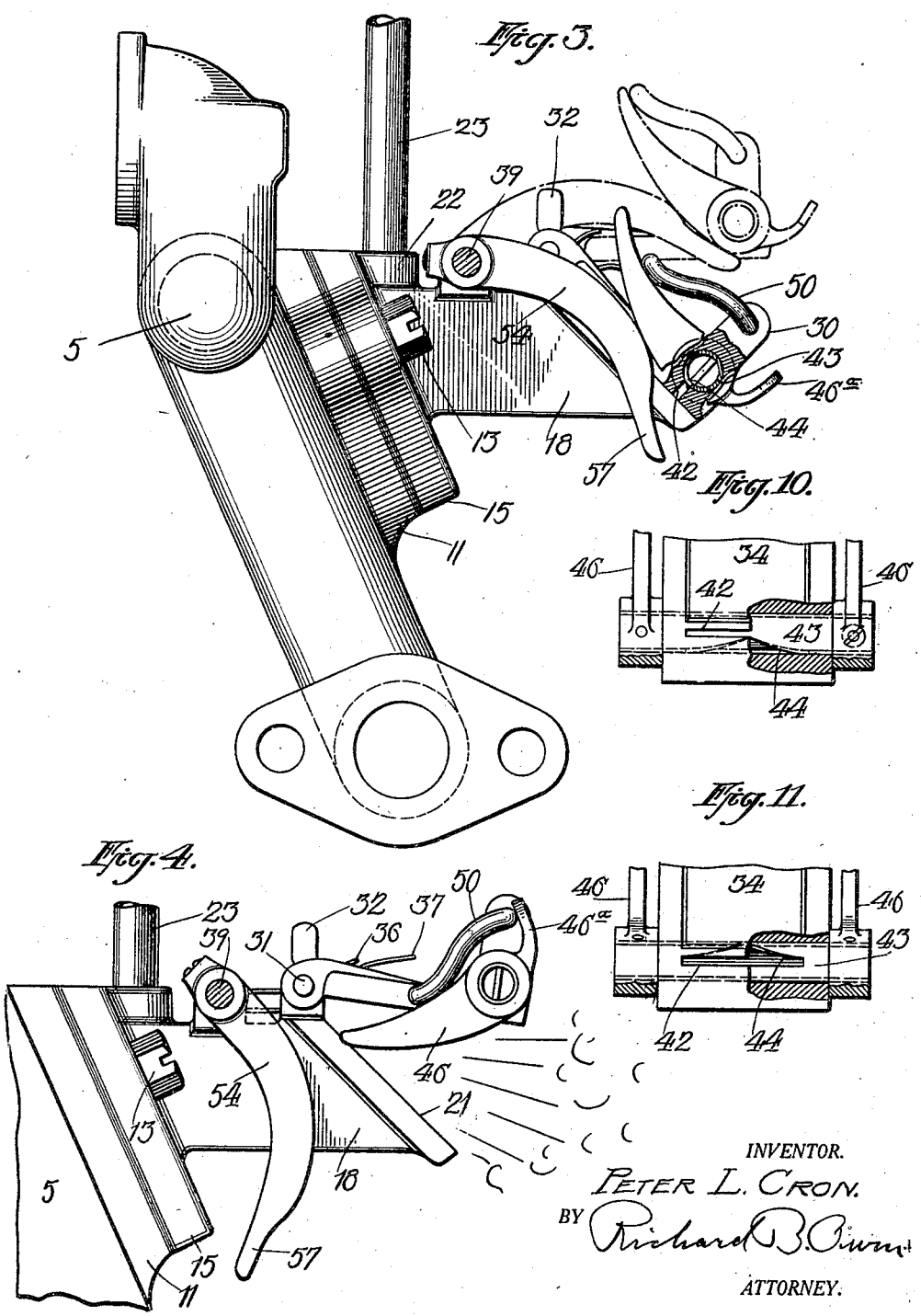

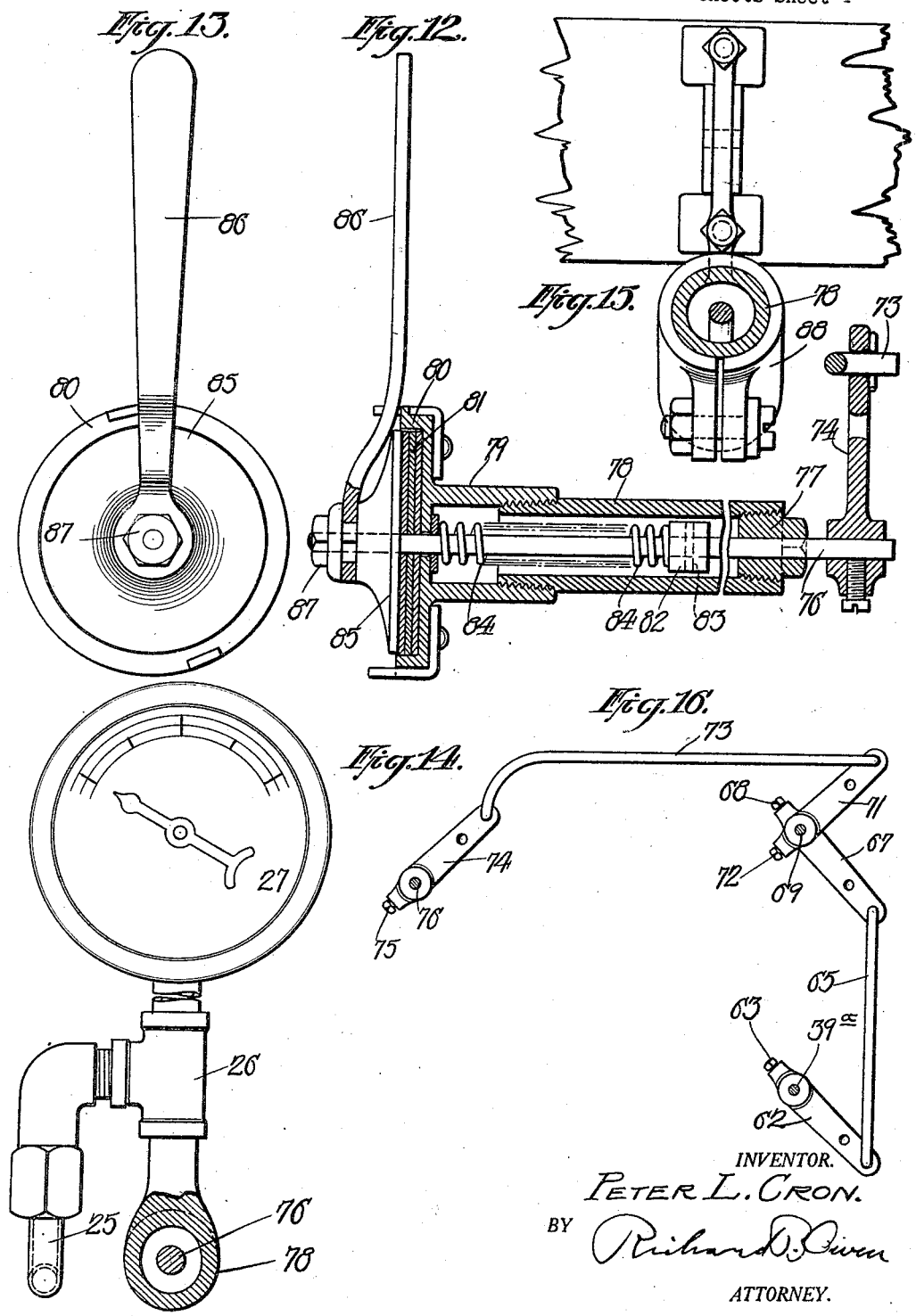

Patented Nov. 4, 1924.

1,514,136

UNITED STATES PATENT OFFICE.

PETER L. CRON, OF ELIZABETH, NEW JERSEY.

ATMOSPHERIC MOTOR CONTROL, BACK-FIRE TRAP, AND MOTOR LOCK.

Application filed May 10, 1922, Serial No. 559,973. Renewed August 29, 1924.

*To all whom it may concern:*

Be it known that I, PETER L. CRON, a citizen of the United States, residing at Elizabeth, in the county of Union and State of New Jersey, have invented certain new and useful Improvements in Atmospheric Motor Controls, Back-Fire Traps, and Motor Locks, of which the following is a specification.

This invention relates to an atmospheric motor control, back fire trap and motor lock and more particularly to a novel and improved mechanism attachable to the intake manifold of a motor vehicle whereby the gas mixture may be regulated by the operator from the steering wheel.

The primary object of the invention is the provision of a manually operable mechanism attachable to the intake manifold for regulating the mixture of gas from the carburetor with the air including provision whereby the motor may be converted into an air compressor permitting the operator to have complete control of the motor vehicle especially on long and steep down grades and consequently removing considerable wear and tear from the brake bands and otherwise eliminating the danger incident to a car carrying a heavy load especially in mountainous country.

Another and equally important object of the invention is the provision of an atmospheric motor control device which permits of a constant saving of fuel consumption and at the same time permits of the proper regulating of the mixture without adjusting the carburetor feed irrespective of the altitude where the car is being driven or the specific gravity of the fuel being used.

A further object of the invention is the provision of a device of the above character which is constantly under the control of the operator without undue attention while driving, and so designed that if it is necessary to speed up the motor, as when climbing a hill, thus causing the motor to become very hot, the atmospheric control mechanism can be actuated to effect an immediate cooling of the engine so that resistance from the motor takes place when descending or travelling on a down grade.

Another and continued object of my invention is the construction of a combined atmospheric motor control mechanism and back fire trap attachable to the intake manifold of an internal combustion engine including a combined flap valve and vacuum breaker valve so disposed that the operator may observe the condition of the vacuum and regulate the mixture without adjusting the carburetor, the said gate valve being instantly and automatically closed at each successive back fire and consequently preventing fire taking place in the carburetor.

A further object of my invention is the inclusion of a motor lock in combination with the back fire trap and atmospheric motor control which permits of the mechanism to be rendered inoperative and consequently preventing the admission of fuel to the engine, said lock consisting of a removable member so pivoted to the mechanism that the same is not interchangeable and which can be replaced and removed with facility and ease by the operator of the car without tools or implements.

With these and other objects in view the invention consists in the construction and novel combination of parts hereinafter fully described, illustrated in the accompanying drawing, and pointed out in the subject matter being claimed, it being understood that various changes in the form, proportion, size and minor details of construction may be resorted to without departing from the spirit and scope of the invention.

In the drawings, Figure 1 is a view showing the device installed on the intake manifold of an engine and the relation of the operative mechanism to the steering wheel.

Figure 1ª is a fragmentary view of the steering wheel and the lever control for operating the valve.

Figure 2 is a section through the back fire trap showing the manner of mounting the same on the intake manifold.

Figure 3 is a side view partly in section showing the different positions of the flap valve and the vacuum breaker valve.

Figure 4 is a view showing the flap valve when opened as the result of a back fire.

Figure 5 is a sectional plan taken on the line 5—5 of Figure 2.

Figure 6 is a section taken on the line 6—6 of Figure 5.

Figure 7 is a sectional view taken on the line 7—7 of Figure 5.

Figure 8 is a vertical section taken on the line 8—8 of Figure 2 and showing the motor lock.

Figure 9 is a sectional view taken on the line 9—9 of Figure 2.

Figure 10 is a view showing the vacuum breaker valve when closed.

Figure 11 is a similar view to Figure 10 showing the vacuum breaker valve when entirely open.

Figure 12 is a sectional view through the housing of the spring held lever control for operating the valve.

Figure 13 is a top plan of the lever in its inoperative position.

Figure 14 is a view of the vacuum dial and the pipe connections thereto.

Figure 15 is a view partly in section of the lever housing and the supporting bracket.

Figure 16 is a view of the connecting rod and levers between the control lever and the operating rod for actuating the valve.

Referring now to the drawings wherein like reference characters designate corresponding parts throughout the several views, 5 designates the intake manifold as an entirety and 6 the carburetor, both being of any well known or standard construction and 7, 8, designates the dash and instrument board respectively, the steering post being shown as at 9 and its steering wheel as at 10 of the conventional type of automobile on which my invention is to be installed and operated in the manner now to be set forth in detail.

The thickened front wall 11 of the intake manifold is tapped as at 12 and rigidly secured thereto by bolts 13 or other fastening element is the casting designated in its entirety by numeral 14 and which constitutes the back fire trap, it being observed that the rear inclined, thickened wall 15 of said trap is separated from the thickened wall 11 of the manifold by a gasket 16 as clearly shown by Figure 2 of the drawing. The said casting is of course, open so as to be in communication with the intake manifold and in order to prevent back fire into the carburetor a wire mesh 17 is interposed in the manifold below the opening communicating with the interior of the trap so that gas may travel through the mesh but be prevented from returning to the carburetor. Consequently if back fire should take place gas expansion will take place in the trap and will be released in the manner subsequently to be referred to.

The side walls 18 of the casting constituting the back fire trap are preferably formed integral with the top and bottom 19, 20, the latter being somewhat longer than the top thereof so as to produce an inclined gate seat 21. The said top 19 of the trap is provided with a threaded boss 22 to which the threaded conduit or pipe 23 is connected, which pipe is in turn in communication with the bent pipe 25 extending through the dash and instrument board through the T-connection 26. A vacuum indicator housing and dial 27 attached to the T-connection 26 is positioned adjacent the instrument board and slightly offset and below the steering wheel 10 whereby the operator may know at all times exactly how much vacuum exists in the back fire trap so that the mixture of gas and air may be regulated in accordance with the condition of the engine as when the same is overheated after climbing a steep grade. Should the motor miss or improper mixture of the gas and air take place, the indicator hand or vacuum indicator dial 27 will register by oscillating back and forth until the operator regulates the air valve until the proper mixture is effected, thus getting the maximum power from the fuel and the motor.

The top 19 of the back fire trap is formed with a pair of spaced lugs 30 having transverse, aligned apertures therethrough for receiving a locking pin 31 bent at its upper end as at 32, which pin also hingedly supports the extensions or arms 33 of the gate valve or flap valve 34 positioned on the seat 21. The locking pin 31 is provided with a groove or notch 35 which receives the upper leaf 36 of a flat spring, the lower leaf 37 of said spring extending outwardly a considerable distance so that the downwardly curved end 38 thereof bears against the top of the gate valve to normally return the same to its closed position when raised by a back fire.

A transverse rock shaft 39 journalled in bearings 40 rearwardly of the locking pin 31 is positioned within the bight portion of the leaf spring above referred to so that the same is always maintained in its proper position with respect to the gate valve 34 and at the same time permits of the easy removal of said spring and the entire gate valve 34 when the driver of the car desires to lock the motor and prevent the operation of the engine which will be apparent since a vacuum cannot be obtained when the back fire trap is opened to the atmosphere.

The flap valve 34 is so modified at the bottom thereof as to provide a valve seat 41 extending across the bottom thereof and is further provided with a transverse slot or recess 42 which is in communication with the interior of the trap and is normally closed by the rotary valve 43 within the seat 41, which valve is provided with a curved substantially triangular opening or recess 44 which may register and limit the said opening to vary the quantity of air to be admitted into the trap and consequently the manifold to enrich or produce a lean mixture.

The valve 43 which I have heretofore designated as a vacuum breaker valve is provided with a pair of inwardly extending, gradually tapered arms 46 which, when actuated, rotates the said valve to permit the triangular opening 44 to register with the recess 42 and vary the quantity of air to be introduced. The said arms 46 are normally maintained down by the curved bent rod 50 extending through the lugs 51 above the seat 41 by the resilient spring 52, secured at one end to the seat and at its opposite end to a set screw 53 on the bent rod as clearly shown by Figure 9 of the drawing, each of said arms being limited in its movement by the extension 46ª. In order to raise the arms 46 and consequently rotate the valve 43 to vary the opening whereby the desired volume of air may be admitted, I have provided a pair of actuating members in the form of curved arms 54 positioned on the shaft 39 by set screws 55 and locked to the shaft by pins 56 passing through the shaft as clearly shown by Figure 6 of the drawing. The respective arms 54 as shown are curved inwardly toward the manifold and are so disposed with relation to the reduced ends of the arms 46 so that when the shaft 39 is actuated and the arms 54 moved outwardly, the same will engage the said arms 46 so as to raise the same sufficiently to rotate the valve 43 and consequently vary the openings above referred to, communicating with the interior of the trap. The respective arms 54 are also reduced toward their lower ends as at 57 and are of such length as to actuate the arms 46 to the required degree and if necessary raise the entire flap valve 34 to admit air directly into the trap. However, it will be observed that the valve 43 may be rotated and air admitted upon the actuation of the shaft 39 and the arms 54 without raising the flap valve 34 in which instance the vacuum resulting in the trap can be broken or diminished at will when observed by the driver and when the vacuum registers on the dial 27 and if back fire should take place, the flap valve 34 will automatically open and close without effecting the adjustment of the valve openings.

Reference being had to Figure 2 of the drawing, it will be observed that I have provided a plurality of transversely extending rods or bars 14ª within the trap adjacent to the seat 21 so that when the locking pin 31 and the flap valve 34 are removed, it will prevent the insertion of some article such as a piece of cloth in the trap in the endeavor to close the opening necessary to create sufficient vacuum to operate the motor. The rods would then prevent the possibility of this foreign matter from being sucked into the manifold to the engine as is well understood.

In order to permit the mechanism to be properly operated from a position at the driver's seat by a hand control arranged in proximity to the throttle lever 60, the shaft 39 is connected to a second shaft 39ª by a connecting sleeve 61, each of said shafts having recesses adjacent their respective ends to receive the set screws 62 extending through the sleeve as clearly shown by Figure 7. By reason of this construction, I am enabled to attach the shaft 39ª to the opposite end of the shaft 39 and in the same manner depending of course upon the position of the carburetor and the particular type and style of manifold and engine on which the device is to be installed. To the shaft 39ª a lever arm 62 is connected by a set screw 63, the opposite end of the lever arm 62 having an aperture to receive the bent end 64 of an actuating rod 65 prevented from being displaced and disconnected from the arm 62 by a cotter pin or other retaining means. The opposite hooked end 66 of the rod 65 is similarly attached to a lever arm 67 secured by a set screw 68 to an angularly disposed operating shaft 69 extending upwardly through a slot 70 of the dash board. A laterally extending lever arm 71 is likewise secured by a set screw 72 to the shaft or rod 69, the last mentioned lever arm 71 being connected by a bent, laterally extending cross rod 73, the opposite hooked end of which is in turn connected to a lever arm 74 secured by a set screw 75 to the main operating shaft 76 which is under the constant control of the driver. It will be readily understood that by reason of the lever arm and rod connections to the shaft 39 and 39ª that but very slight movement of the curved arms 54 may be effected to actuate the corresponding arms 46 when the required volume of air to be admitted.

Reference being had now to Figures 12 and 13 of the drawings, I have shown the main actuating rod 76 as extending through a threaded connection 77 in one end of a cylindrical housing 78, the opposite end of the housing being also internally threaded for connection with a disked head 79, the flanged top 80 of which receives a plurality of friction discs 81 through which the rod 76 extends. On the rod 76 and within the housing 78, a sleeve 82 is provided, said sleeve being secured by a pin 83 to the rod 76 and interposed between the sleeve and the member 79, a coil spring 84 is positioned so that the head 85 attached to the upper end of the shaft 76 will frictionally bear against the discs 80. The said head 85 and the operating lever 86 are secured by the nut 87 in proper manner on the upper end of the rod 76 so that the operator can properly regulate the position of the lever 86 to vary the volume of air to be admitted to the trap and by reason of the frictional engagement of the operating mechanism as described in connection with Figure 12 when the control mechanism is properly set, the vibration of the machine will not move the levers or the mechanism connected thereto. The housing 78 may be secured in any well known manner to a split bracket 88 held in any well known manner by suitable fastening elements to a permanent part of the machine. preferably the instrument board.

From the above construction taken in connection with the specification, it will be readily recognized that I have provided a highly efficient appliance, capable of universal use in connection with various types of motor vehicle engines which not only reduces the consumption of fuel but permits of the greater efficiency in the operation of a vehicle under varying conditions due either to the grade of fuel, atmospheric pressure due to the altitude and particularly when driving in mountainous country. Under normal conditions when the machine begins to climb a hill and the motor begins to speed, in a very short time the engine begins to get hot and a considerable vacuum is created. By adjusting the valve mechanism of my device the vacuum may be easily broken and the machine operate under normal conditions. Now when the machine starts to travel down grade for instance, the flap valve 34 may be entirely raised so that the engine can suck air and thus the motor acts as an air compressor thus relieving the strain and the wear and tear on the brake bands to control the operation of the vehicle when on a steep grade. It is well-known that when descending a grade even though the machine is throttled down to the minimum, sufficient gas is being introduced into the cylinders to result in back fire or a series of back fires when the spark and air is introduced when the machine reaches the bottom of the grade and is ready to proceed on the level. Of course this objection is eliminated by my device so that when the machine reaches the bottom of a grade, the flap valve 34 may close and the proper mixture of fuel is readily had to proceed. A further advantage and objection overcome is by the use of this mechanism particularly in high altitudes which has an effect upon the fuel in which instance it has been necessary to regulate the carburetor feed, thus necessitating the readjustment of the feed when the machine is returned to a low altitude. Furthermore the variation in the grades of fuel dispensed along the journey also necessitates the variation in the feed or the volume of air introduced and consequently the best results may be obtained without adjusting the carburetor by regulating the air inlet through the valve construction. Under all conditions the removal of the flap valve by simply withdrawing the lock pin absolutely prevents the unauthorized use of the machine and thus the device results in a motor lock and renders the machine inoperative until the non-interchangeble flap valve is replaced. This of course may be effected without the use of any tools whatsoever and the removed valve is of such construction that the same can be readily placed in the operator's pocket when leaving his machine parked.

While I have shown one form by way of example, permitting the operation of the flap valve and the vacuum breaker valve through a series of lever arms and rod connections it will be readily recognized that other constructions may be resorted to to effect the same result. However, I do not wish to be limited or restricted to the exact construction shown to operate the same valves which construction is capable of various modifications by the skilled mechanic and those experienced in the art.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention, what I claim as new and desire to secure by United States Letters Patent is:—

1. A motor control mechanism comprising a trap attachable to the intake manifold of an engine and in communication therewith, means for determining the vacuum created in said trap, a closure adapted to be opened upon back fire of the engine and air regulating means cooperating with the closure to vary the fuel mixture within the trap and intake manifold.

2. A motor control mechanism comprising a trap attachable to the intake manifold of an engine and in communication therewith, means for determining the vacuum created in said trap, a removable closure on the front of said trap adapted to be opened upon back fire of the engine and manually operable means cooperating with the closure for varying the fuel mixture within the trap and intake manifold without effecting the movement of the closure.

3. A motor control mechanism comprising a trap attachable to the intake manifold of an engine and in communication therewith, means for determining the vacuum created in said trap, a gravity hinged closure seated on the front of the trap and adapted to be opened upon back fire of the engine, and valve controlled means cooperating with the closure for varying the fuel mixture within the trap and intake manifold without effecting the movement of the closure.

4. A motor control mechanism comprising a trap attachable to the intake manifold of an engine and in communication therewith, means for determining the vacuum created in said trap, a removable gravity hinged closure seated in the front of the trap, and adapted to be opened upon back fire of the engine, and air supply regulating means cooperating with the closure for varying the fuel mixture within the trap and intake manifold without effecting the movement of the closure.

5. A motor control mechanism comprising a trap attachable to the intake manifold of an engine and in communication therewith, means for determining the vacuum created within said trap and a combined flap valve and vacuum breaker valve cooperating therewith normally closing the front of the trap and adapted to be opened upon back fire of the engine.

6. A motor control mechanism comprising a trap attachable to the intake manifold of an engine and in communication therewith, means for determining the vacuum created within said trap, and a detachable, combined flap valve and independently operable vacuum breaker valve cooperating therewith, normally closing the front of the trap and adapted to be opened upon back fire of the engine.

7. A motor control mechanism comprising a trap attachable to the intake manifold of an engine and in communication therewith, means for determining the vacuum created within said trap, a combined flap valve and a manually controlled independent vacuum breaker valve cooperating therewith normally closing the front of the trap and adapted to be opened upon back fire of the engine, said flap valve being operable without altering the adjustment of said vacuum breaker valve.

8. A motor control mechanism comprising a trap attachable to the intake manifold of an engine and in communication therewith, means for determining the vacuum created within said trap, and a combined flap valve and adjustable vacuum breaker valve in the bottom thereof, cooperating therewith normally closing the trap, manually operable means for setting the vacuum breaker valve to regulate the fuel mixture within the trap, said flap valve being operable to open upon back fire of the engine without effecting the adjustment of the vacuum breaker valve.

9. A motor control mechanism comprising a trap attachable to the intake manifold of an engine and in communication therewith, means for determining the vacuum created within said trap, a flap valve normally closing the front of the trap, a rotary valve cooperating with the flap valve to vary the air supply and regulate the fuel mixture within the trap, lever operating mechanism for actuating said rotary valve, said flap valve being adapted to open upon back fire of the engine without effecting the adjustment of the said rotary valve.

10. A motor lock comprising a trap attachable to the intake manifold of an engine and in communication therewith, a removable closure for the front of the trap, and a removable locking pin for said closure.

11. A motor lock comprising a trap attachable to the intake manifold of an engine and in communication therewith, a removable hinged closure for the front of the trap, and a removable locking pin pivotally supporting said closure.

12. A motor lock comprising a trap attachable to the intake manifold of an engine and in communication therewith, said trap having lugs on the top thereof, a removable hinged closure for the front of the trap, said closure having extensions lying adjacent the lugs and a locking pin extending through the lugs and extensions for pivotally supporting the closure.

13. A motor lock comprising a trap attachable to the intake manifold of an engine and in communication therewith, a detachable closure, a locking pin for pivotally supporting said closure from the top of the trap, and resilient means for normally maintaining said closure seated on the front of the trap.

14. A motor lock comprising a trap attachable to the intake manifold of an engine and in communication therewith, said trap having spaced, apertured lugs on the top thereof, a detachable closure and apertured extensions formed therewith lying adjacent the lugs, a removable locking pin extending through the apertured lugs and extensions, and resilient means bearing against the locking pin and the closure.

15. A motor lock comprising a trap attachable to the intake manifold of an engine and in communication therewith, a gravity hinged closure for the front of the trap, a removable locking pin for pivotally supporting said closure, said pin having a notch therein and removable spring pressed means engaging the notch in said pin and the closure.

16. A motor control mechanism comprising a trap attachable to the intake manifold of an engine and in communication therewith, means for determining the vacuum created in said trap, a closure for said trap, means permitting said closure to open upon back fire of the engine, a rock shaft mounted on the trap, air regulating means cooperating with the closure and operable by the rock shaft to vary the fuel mixture within the trap and manifold without effecting the movement of the closure.

17. A motor control mechanism comprising a trap attachable to the intake manifold of an engine and in communication therewith, means for determining the vacuum created in said trap, a closure for the trap, means permitting said closure to open upon back fire of the engine, a rock shaft mounted on the trap and operable from a position at the driver's seat, air regulating means cooperating with the closure to vary the fuel mixture within the trap and manifold without effecting the movement of the closure, and means carried by the shaft to vary the volume of air to be introduced.

18. A motor control mechanism comprising a trap attachable to the intake manifold of an engine and in communication therewith, means for determining the vacuum created in said trap, a closure for the trap, means permitting said closure to open upon back fire of the engine, a rock shaft mounted on the top of the trap, lever means operable from the driver's seat for actuating said shaft, depending arms carried by the shaft, an air valve seated within the bottom of the closure and operable by the depending arms to vary the fuel mixture within the trap and manifold without effecting the movement of the closure.

19. A device of the class described comprising a casting attachable to the intake manifold of an engine, a closure for said casting, a valve seat and a rotatable valve within the closure, and means for adjusting said valve in its seat without effecting the movement of the closure.

PETER L. CRON. [L. S.]